(12) United States Patent
Schempp

(10) Patent No.: US 7,380,991 B2
(45) Date of Patent: Jun. 3, 2008

(54) OPTICAL CONNECTOR ARRANGEMENT

(75) Inventor: Otto Schempp, Rappenau (DE)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/584,958

(22) PCT Filed: Nov. 12, 2004

(86) PCT No.: PCT/EP2004/012816

§ 371 (c)(1),
(2), (4) Date: Jul. 2, 2007

(87) PCT Pub. No.: WO2005/066673

PCT Pub. Date: Jul. 21, 2005

(65) Prior Publication Data

US 2007/0248304 A1  Oct. 25, 2007

(30) Foreign Application Priority Data

Dec. 30, 2003  (DE) ................. 103 61 819

(51) Int. Cl.
*G02B 6/38* (2006.01)
*G02B 6/36* (2006.01)
*H01R 33/945* (2006.01)

(52) U.S. Cl. ............... 385/59; 385/76; 385/77; 385/88; 385/89; 385/92; 385/136; 385/137; 385/139; 439/577

(58) Field of Classification Search ............ 385/53, 385/54, 56, 70, 71, 72, 76, 77, 78, 84, 86, 385/87, 88, 89, 91, 92, 93, 94, 139, 136, 385/137; 439/577
See application file for complete search history.

(56) References Cited

U.S. PATENT DOCUMENTS

| 4,645,295 A | 2/1987 | Pronovost ............ 385/53 X |
| 5,091,991 A * | 2/1992 | Briggs et al. ........... 385/82 |
| 6,357,934 B1 * | 3/2002 | Driscoll et al. ......... 385/86 |
| 6,443,627 B1 * | 9/2002 | Anderson et al. ....... 385/56 |
| 2002/0090177 A1 * | 7/2002 | Anderson et al. ....... 385/60 |
| 2007/0047877 A1 * | 3/2007 | Pepe .................... 385/86 |

FOREIGN PATENT DOCUMENTS

| DE | 199 23 246 A1 | 5/1999 | .......... 385/53 X |
| DE | 101 01 812 A1 | 1/2001 | .......... 385/53 X |

* cited by examiner

*Primary Examiner*—Brian M Healy
(74) *Attorney, Agent, or Firm*—Larry I. Golden

(57) ABSTRACT

The invention relates to a connector arrangement for optical wave guides for establishing multimedia connections in motor vehicles, e.g. in accordance with the MOST®-Standard wherein a first and a second fiber section are each enclosed by a sleeve and by connecting it fixedly with the sleeve, both sleeves form an integrally constructed, common fiber holder for the two fiber sections, which can be inserted into the rear fiber receptable of the connector housing.

18 Claims, 11 Drawing Sheets

OPTICAL CONNECTOR ARRANGEMENT

FIELD

The invention relates to a connector arrangement for connecting optical fibers in general and for establishing multimedia connections in motor vehicles, e.g. in accordance with the MOST® standard, especially.

BACKGROUND

Due to the increasing complexity of applications in the field of informative motor vehicle electronics, which can be called multimedia by now, new concepts have become necessary for networking various devices.

E.g., at least the car radio, mobile telephone and navigation system should be able to communicate with one another bidirectionally so that, e.g. music reproduction of the car radio can be muted and the mobile radio connection can be operated via the radio loudspeakers when the user wishes to call by telephone. However, it can be seen that this is only a very simple application and that hardly any limits are set to the multimedia networking of on-board electronics in order to satisfy the requirements of the customers.

To meet these complex requirements, optical data transmission has been successfully used for these connections in the motor vehicle field. A new standard by the name of MOST® has been separately developed in this regard. The specifications of the MOST® standard are published as "MAMAC specification" Rev 1.0, November 2002, version 1.0-00 at http://www.mostnet.de/downloads/Specifications/MAMACSpecification_1V0-00.pdf and at http://www-.mostnet.de/downloads/Specifications/MOST%20Physical%20Layer%20Specification/010233WgPhy Drawings.zip. Reference is herewith made to the aforementioned specification and its content is incorporated into the subject matter of the present disclosure to its full extent by reference.

Optical MOST® connectors are designed for connecting at least two optical waveguides. A number of such connectors are known today.

Referring to the rear connection of the optical waveguides at the connector, it is known to provide the optical waveguides with ferrules and to install these in a holder, each ferrule being pressed by a spiral spring.

However, this construction comprises at least six individual parts which is associated with relatively high production costs.

However, the complex assembly of the multi-part arrangement, which can be called "fumbling" in the case of manual assembly which may be necessary, e.g. during a repair is even more serious.

In this process, there is a risk, for example, that individual parts such as the spiral springs or the holder can be lost during disassembly or assembly so that a replacement part must be procured again before the assembly can be finished. Furthermore, these connectors are subject to faults due to their complexity.

Altogether, this solution is greatly in need of improvement, particularly in order to be competitive in quality and price in the hotly contested market and to be able to withstand the hard workshop operation.

SUMMARY

Therefore, it is the object of the invention to provide a connector arrangement that can be handled in a simple and reliable manner.

It is another object of the invention to provide a connector arrangement which can be produced cost effectively and without being subject to faults.

It is a further object of the invention to provide a connector arrangement which ensures an optical connection with little damping.

It is another object of the invention to provide a connector arrangement which avoids or at least reduces the disadvantages of known connectors.

The object of the invention is already achieved in a surprisingly simple manner by the subject matter of the independent claims. Advantageous developments of the invention are defined in the subclaims.

According to the invention, a connector arrangement for optical fibers or waveguides is provided, particularly for establishing multimedia connections in a motor vehicle. Thus, the connection is provided, e.g. for connecting a car radio, which can be extended with multimedia, to other devices on the on-board electronics in order to provide coordinated operation. The connector arrangement is, therefore, constructed particularly in accordance with the specifications of the MOST® standard.

The connector arrangement comprises a connector with a connector housing which has a mating-connector receptacle at the front for mating connection with a mating connector. At the rear of the connector housing opposite to the front, it also has a fiber receptacle or sleeve receptacle for introducing at least one first and second fiber section or, respectively, one first and second sleeve with the first and second fiber section, respectively.

In particular, the fiber receptacle has at least one first and second channel into which the first and second fiber section, respectively, more precisely the first and second sleeve, respectively, can be introduced, more precisely inserted or are inserted in the assembled state or operating state.

The connector arrangement also has the first optical fiber section or optical waveguide section which is permanently and fixedly connected to the first, essentially cylindrical sleeve. In order words, the first sleeve fixedly encloses a front end of the first fiber section.

The connector arrangement also has at least the further second optical fiber section or optical waveguide section which is permanently and fixedly connected to the second, essentially cylindrical sleeve, the second sleeve fixedly enclosing a front end of the second fiber section.

Furthermore, the first and second sleeves are fixedly and permanently, particularly integrally connected to one another and jointly form a permanently fixedly connected fiber holder which, in particular, is integrally constructed. In other words, the fiber holder including the first and second sleeve is constructed of one piece or one part so that it can be introduced as a one-part unit into the rear fiber receptacle and is introduced in the operating state. The two fiber sections are thus connected to one another by the integral fiber holder without requiring a separate ferrule housing. The fiber holder, together with the two fiber sections, thus forms a unit which is fixedly and permanently joined, e.g. by bonding, welding, injection molding or similarly permanent connection and is nondestructively undetachable, even in a state in which it has not yet been introduced into the fiber receptacle.

In other words, the first and second sleeve form an essentially cylindrical tube-like first and second fiber holder section of the integral fiber holder. The first and second sleeve thus represent a first and second ferrule, respectively, or in each case a ferrule section of the fiber holder which can also be called an integral ferrule arrangement comprising the first and second ferrule. Using such an integral fiber holder or uniform dual sleeve or dual ferrule in which the fiber sections are directly assembled is extremely advantageous since the overall construction is considerably simplified. This ensures simple and reliable handling during the assembly and achieves a distinct cost advantage. In particular, separate connecting elements for connecting the two sleeves such as, e.g. a special pushed-on ferrule housing can be dispensed with. Due to the lack of complexity, the arrangement is not subject to faults.

The fiber sections, which are also called pigtails, are preferably directly bonded or welded into the associated sleeve or the sleeves or the fiber holder are molded around the fiber sections.

To connect them, the two sleeves are first inserted into associated channels in the connector housing and then the connector arrangement is plugged together with the mating connector.

At the rear or second end of the fiber sections or pigtails, which is opposite the first end, an electro-optical transducer is connected to each pigtail. The use of the pigtails thus serves to spatially separate the transducers from the connector so that good signal decoupling is expected.

A spring is preferably provided which directly rests against the joint fiber holder or the support in order to essentially apply force to these in the direction of the front of the connector housing or in the direction of insertion of the fiber holder so that a pretension of the fiber sections is generated immediately against the connector housing. This is advantageous in order to generate a contact pressure between the fiber sections and the optical waveguides of the mating connector and thus to achieve a low damping.

In a particularly preferred manner, the fiber holder has a connecting section which is arranged between the first and second sleeve and by means of which the first and second sleeve are spaced apart but are connected integrally to the connecting element and to one another by means of the latter so that an essentially double-T-shaped structure is produced.

Furthermore advantageously, the spring is only a single spring and this single spring generates the pretension jointly for both fiber sections. As a result, separate springs for each sleeve or each fiber section, respectively, can be avoided and thus further simplification of the arrangement can be achieved.

Furthermore, the spring is preferably constructed as a leaf spring of metal and is directly attached to the connector housing, more precisely to the rear of the connector housing in the environment of the fiber receptacle. This embodiment is particularly simple and reliable.

A suitable type of attachment is proposed in that the connector housing has holding channels into which the leaf spring is inserted transversely with respect to the direction of introduction or insertion of the fiber holder in order to be attached to the connector housing by this means.

The leaf spring preferably comprises two holding sections and an elastic spring arm arranged between these so that an essentially M-shaped structure is created, the holding sections being inserted into the holding channels and the spring arm engages, particularly directly the connecting section of the fiber holder in the operating state or assembled state in order to create the pretension.

This arrangement advantageously allows the fiber holder to be tilted so that it is possible to respond to different pressure on the two fiber sections by the respective optical waveguides to be mated.

For this purpose, the fiber holder preferably has a collar-like guide element which can be inserted into the fiber receptacle of the connector housing and, in particular, is also constructed of one piece with the fiber holder, the collar-like guide element being constructed transversely or across the direction of insertion to be smaller than the fiber receptacle at least in as much as there is lateral play which is adequately dimensioned for providing for a tilting or tilting movement of the fiber holder in the connector housing.

In practice, a play of 50 µm to 1 mm between the fiber holder and the fiber receptacle at the appropriate point has been found to be suitable.

It is also advantageous to construct the collar-like guide element transversely asymmetrically so that a protection against polarity reversal is provided.

The fiber holder also advantageously has stop sections which are arranged in front of the collar-like guide element in the direction of insertion of the fiber holder into the connector housing so that they form a stop against which the pretension is effective during the insertion of the fiber holder.

The stop sections for each sleeve are preferably separated from another transversely as a result of which a saving in material is achieved and the free space for the tilting movement is enlarged.

The stop sections too, are preferably constructed asymmetrically so that a further protection against polarity reversal is provided even in an early phase of the insertion of the fiber holder. Furthermore, preferably, the stop sections are constructed transversely smaller than the collar-like guide element so that simple and reliable insertion is guaranteed.

Furthermore preferably, the two sleeves or guide tubes in each case have a guide section and in each case an intermediate section, the intermediate sections being arranged behind the respective guide section in the direction of insertion of the fiber holder, the guide sections being insertable into the channels with relatively accurate fit and the intermediate sections having a smaller diameter than the guide sections. This provides for precise transverse guidance of the sleeves in the channels, on the one hand, and still provides for a large tilting angle.

Especially preferred, the connector is a hybrid connector with additional electrical connections so that both the optical and the electrical connections are established essentially at the same time with one plug-in process.

Apart from the connector arrangement as a whole, the integral dual fiber holder as such and the connector as such are also subject matter of the invention.

In the following, the invention will be explained in greater detail by means of exemplary embodiments and referring to the drawings, identical and similar elements being partially provided with identical reference numbers.

DETAILED DESCRIPTION

Figure 1:
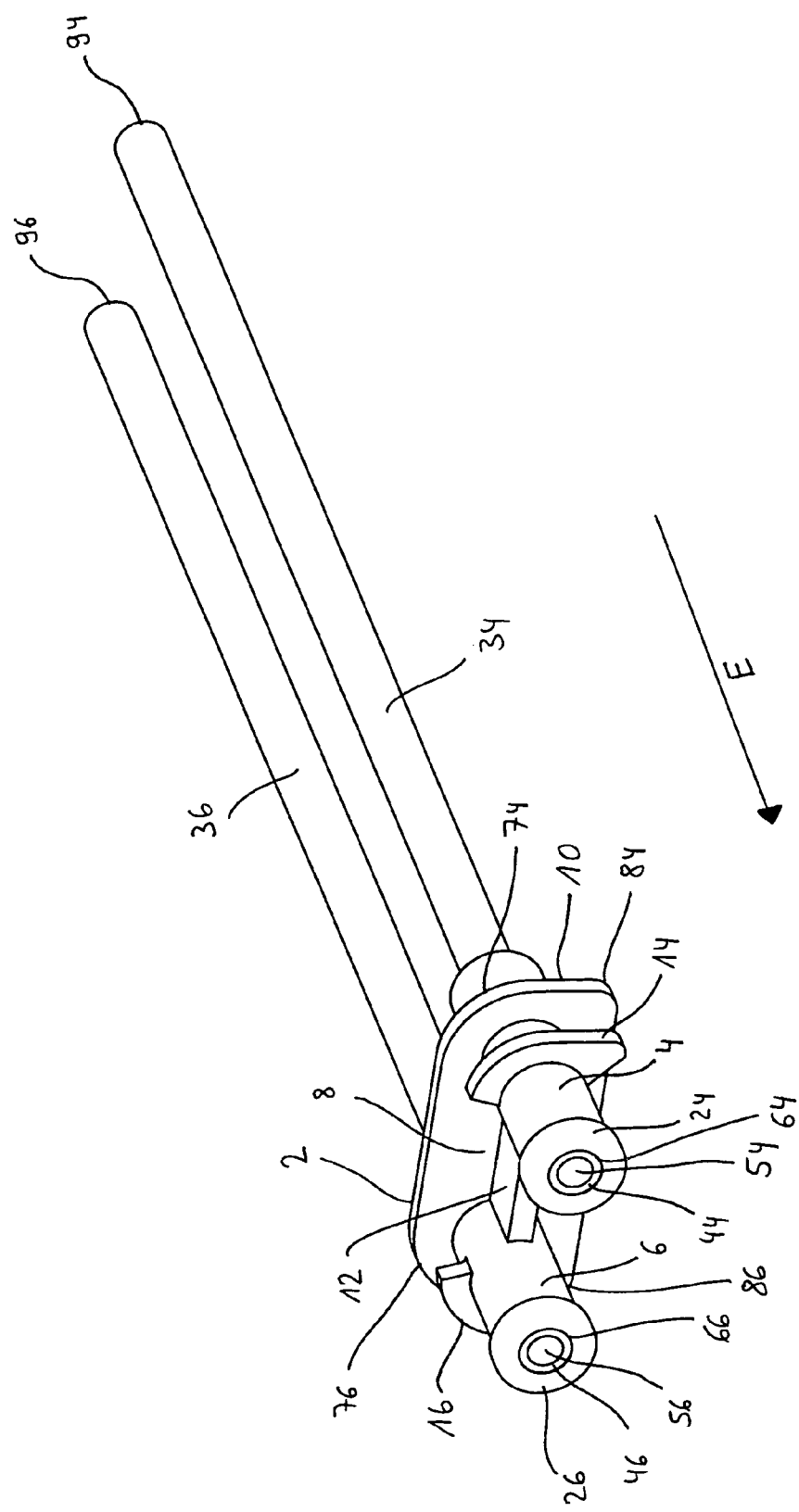
FIG. 1 shows a perspective view obliquely from the front of the fiber holder with two pigtails.

FIG. 1 shows the fiber holder 2 of plastic which includes the first and second sleeve 4, 6, the central connecting element 8, the collar-like guide element 10, a central cross strut 12, extending horizontally, and a first and second stop element 14, 16, all these elements in particular being constructed of one piece with one another and jointly forming the fiber holder 2.

Furthermore, the two sleeves 4, 6 at their front in each case have a circumferential bead 24, 26 which guides the sleeves 4, 6 in the channels of the connector housing.

Into the sleeves 4, 6, a fiber section or pigtail 34, 36 is in each case bonded, each pigtail having a jacket 44, 46 and a light-conducting core 54, 56 as can be seen at the respective front end of the pigtails 64, 66 which is surrounded by the sleeves 4, 6.

The fiber sections 34, 36 are flush with the front edge of the sleeves 4, 6 or set back by about 50 μm with respect to these and are constructed as plastic optical fibers (POF).

The collar-like guide element 10 is essentially constructed rectangularly with rounded corners the upper corners 74, 76 having a greater radius of curvature than the lower corners 84, 86 so that an asymmetric shape is formed which provides protection against polarity reversal.

Furthermore, the guide element 10 is arranged in the rear half of the sleeves 4, 6 and the stop elements or stop surfaces 14, 16 are arranged in the front half, that is to say in front of the guide element 10 in the direction of insertion E.

At the rear end 94, 96 of the fiber sections 34, 36 electro-optical converters (not shown) can be connected.

Figure 2:
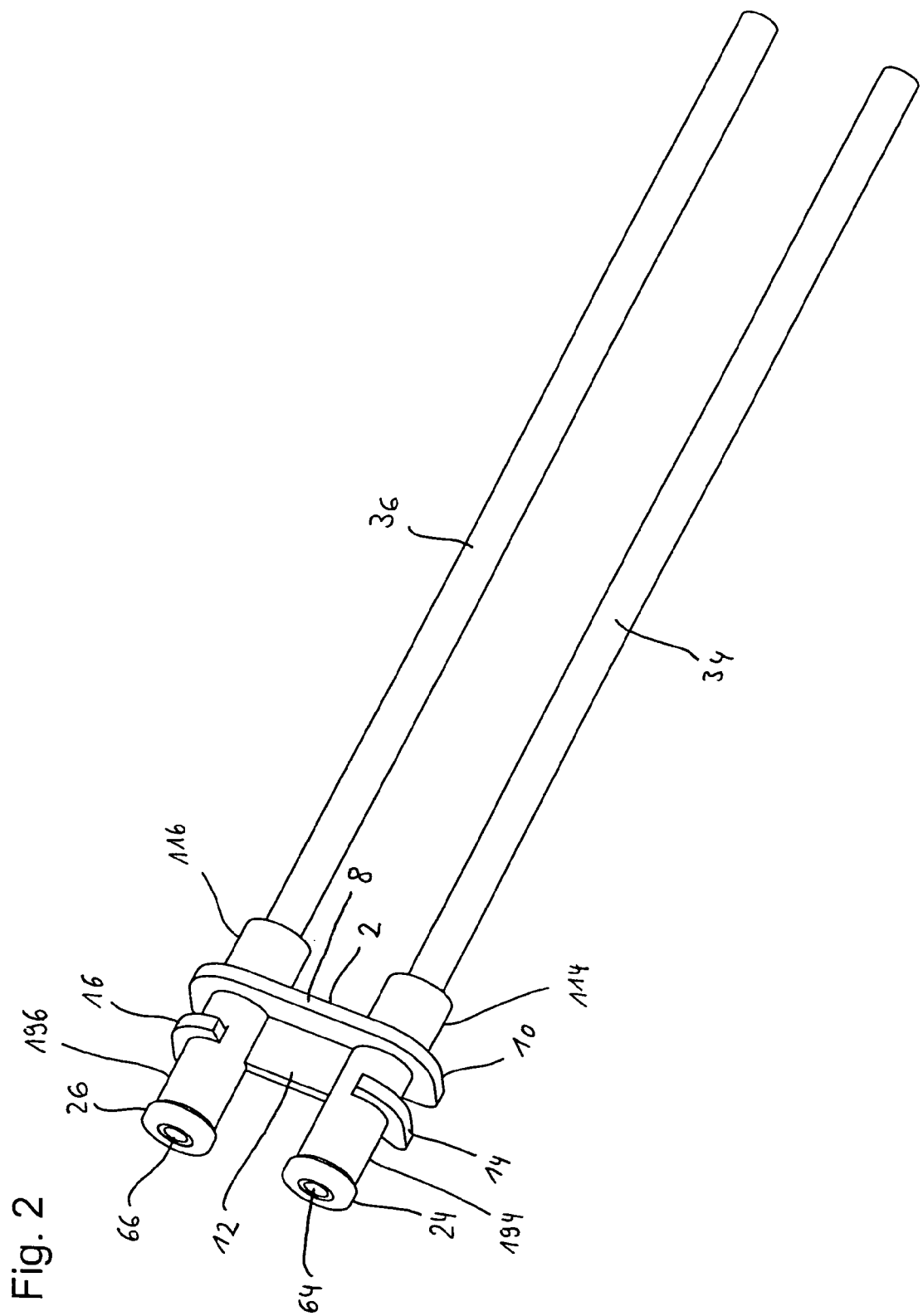
FIG. 2 shows a perspective view obliquely from the top of the fiber holder from FIG. 1.

Referring to FIG. 2, the fiber holder or the fiber holder element 2, which forms a fixedly connected unit with the fiber sections 34, 36, is shown from another perspective in which certain aspects of the fiber holder 2 can be recognized even better.

Figure 3:
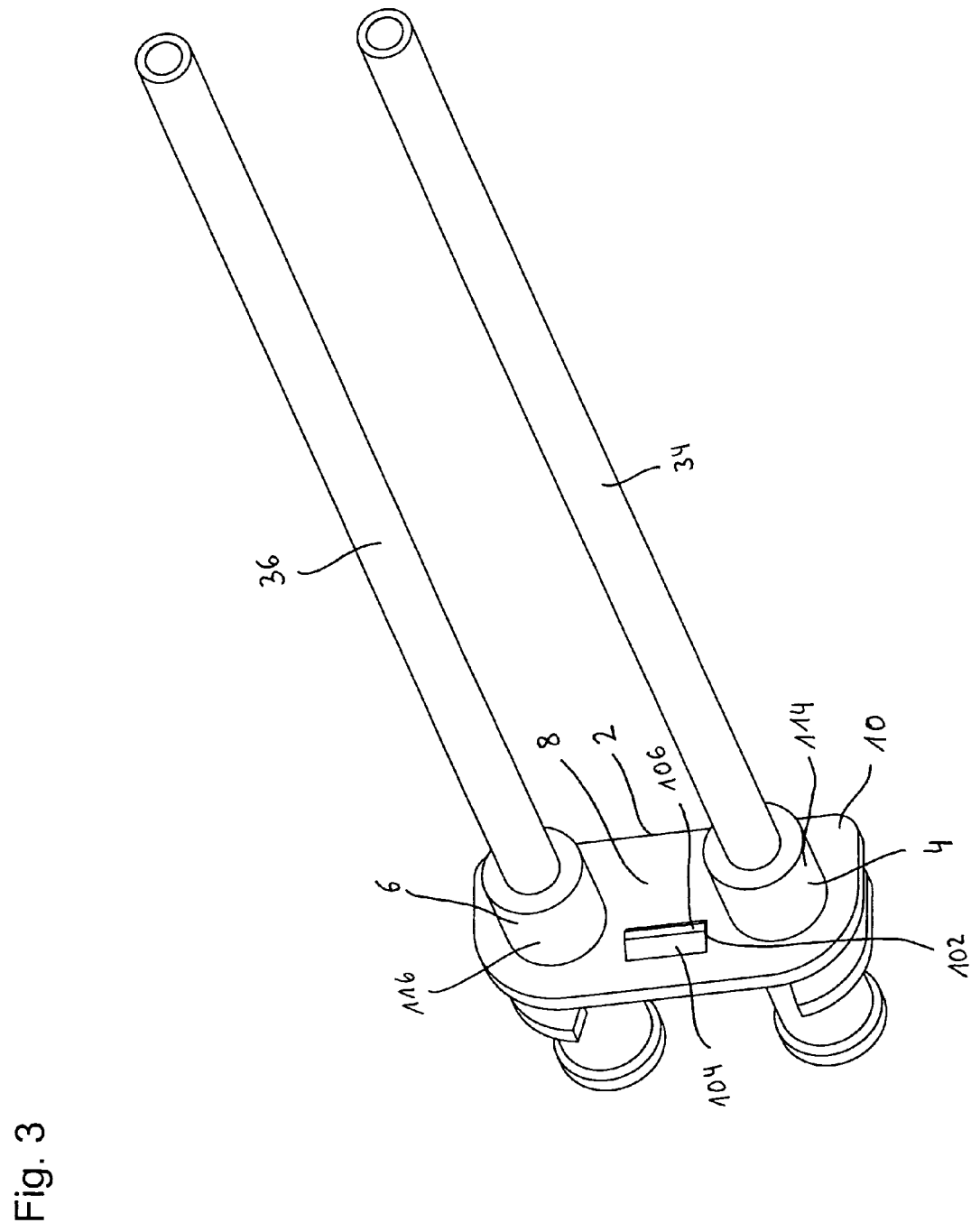
FIG. 3 shows a perspective view obliquely from behind of the fiber holder of FIG. 1.

Referring to FIG. 3, it is shown that the fiber holder 2, more precisely the flat connecting element 8 which is arranged transversely between the sleeves 4, 6, has at its rear a protrusion 102 with an inclined top 104 and a vertical rear side 106.

Furthermore, rear sleeve sections or rear ferrule sections 114, 116, which are arranged behind the guide element 10 and the connecting element 8, are shown.

Figure 4:
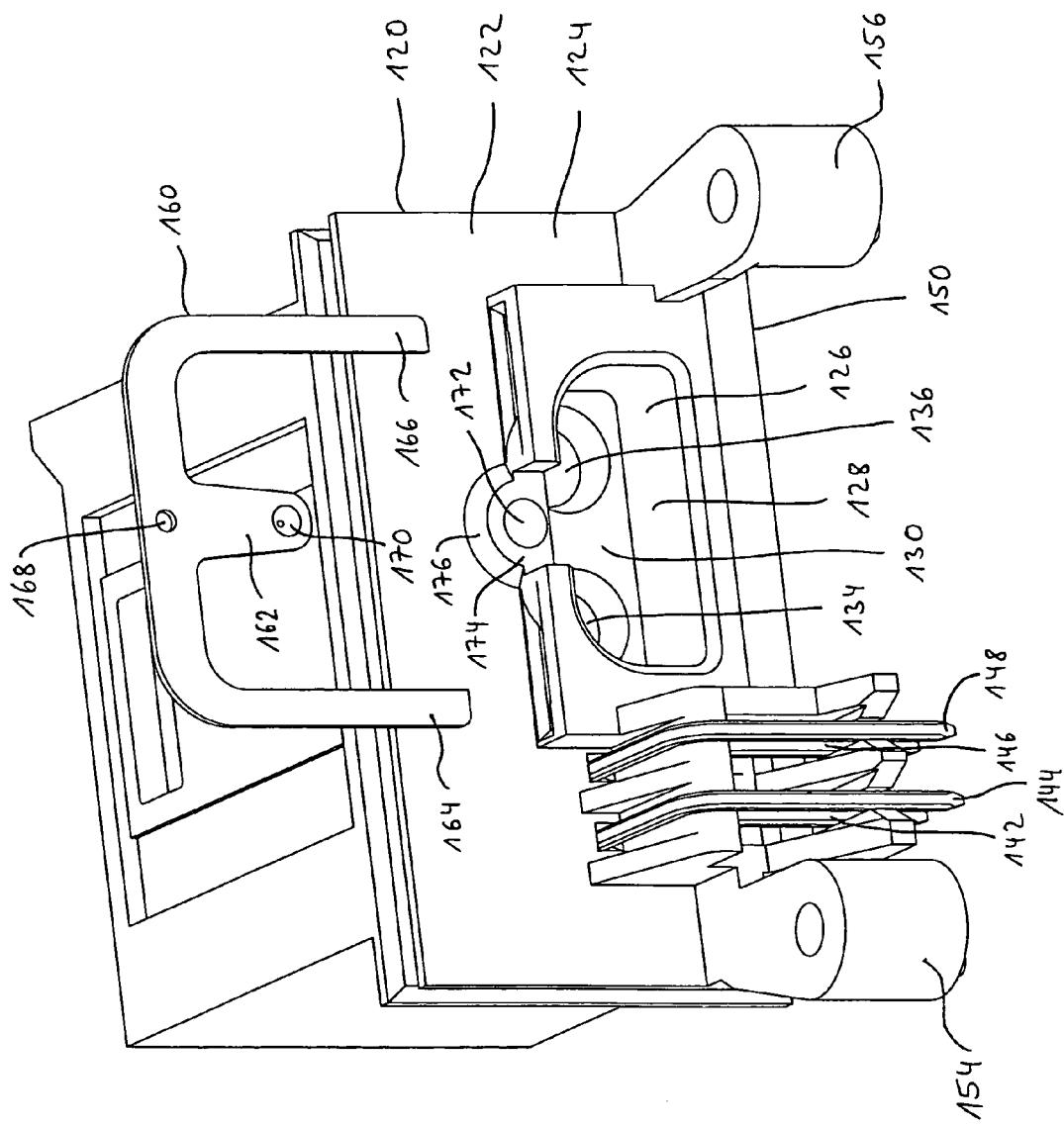
FIG. 4 shows a perspective view obliquely from behind of the connector with spring.

Referring to FIG. 4, the connector 120 with the connector housing 122 is shown. The connector housing 122 has at its rear side 124 the fiber receptacle or sleeve receptacle 126 which is formed by a common cavity 128 and two channels or ferrule channels 134, 136, the common cavity transversely covering the two channels 134, 136. The fiber receptacle or fiber holder receptacle 126 also has a rear stop surface 130 which the stop elements 14, 16 and the transverse strut 12 engages in the assembled state or operating state so that a front stop is formed for the fiber holder 2.

Figure 10:
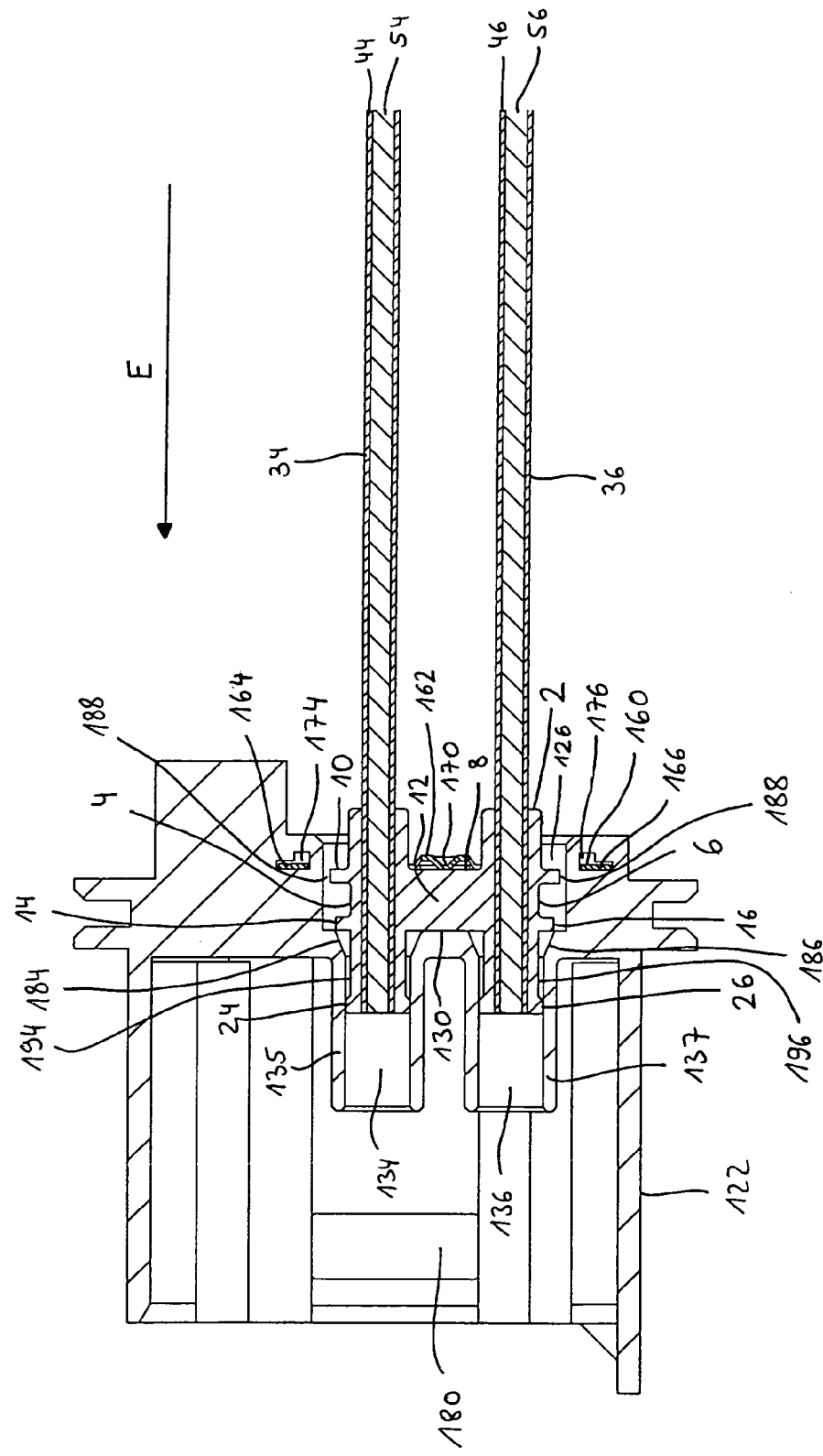
FIG. 10 shows a, horizontal cross section through the connector arrangement along line 10-10 in FIG. 9.

As can be seen best in FIG. 10, the essentially cylindrical channels 134, 136, into which the sleeves 4, 6 are inserted together with the fiber sections 34, 36, are surrounded or defined by cylindrical guides 135, 137, the essentially cylindrical guides 135, 137 being constructed integrally with the connector housing 122 in this example and protruding into the opening 180 of the mating-connector receptacle. This ensures high dimensional stability and a particularly simple design with few single parts.

Referring again to FIG. 4, the connector 120 is a hybrid connector with four electrical angle terminals 142, 144, 146, 148 and has at its underside 150 two assembly feet 154, 156.

Furthermore, an M-shaped leaf spring 160 with a spring arm 162 suspended elastically between two holding legs 164, 166 is shown. The leaf spring 160 has a central opening 168 at which it can be pulled out and a round dome or locking sphere 170. The connector housing has a round recess 172 in a plateau 174 protruding from the rear 124, which is delimited at its top end by an inclined, essentially half-round slide-on area 176.

Figure 5:
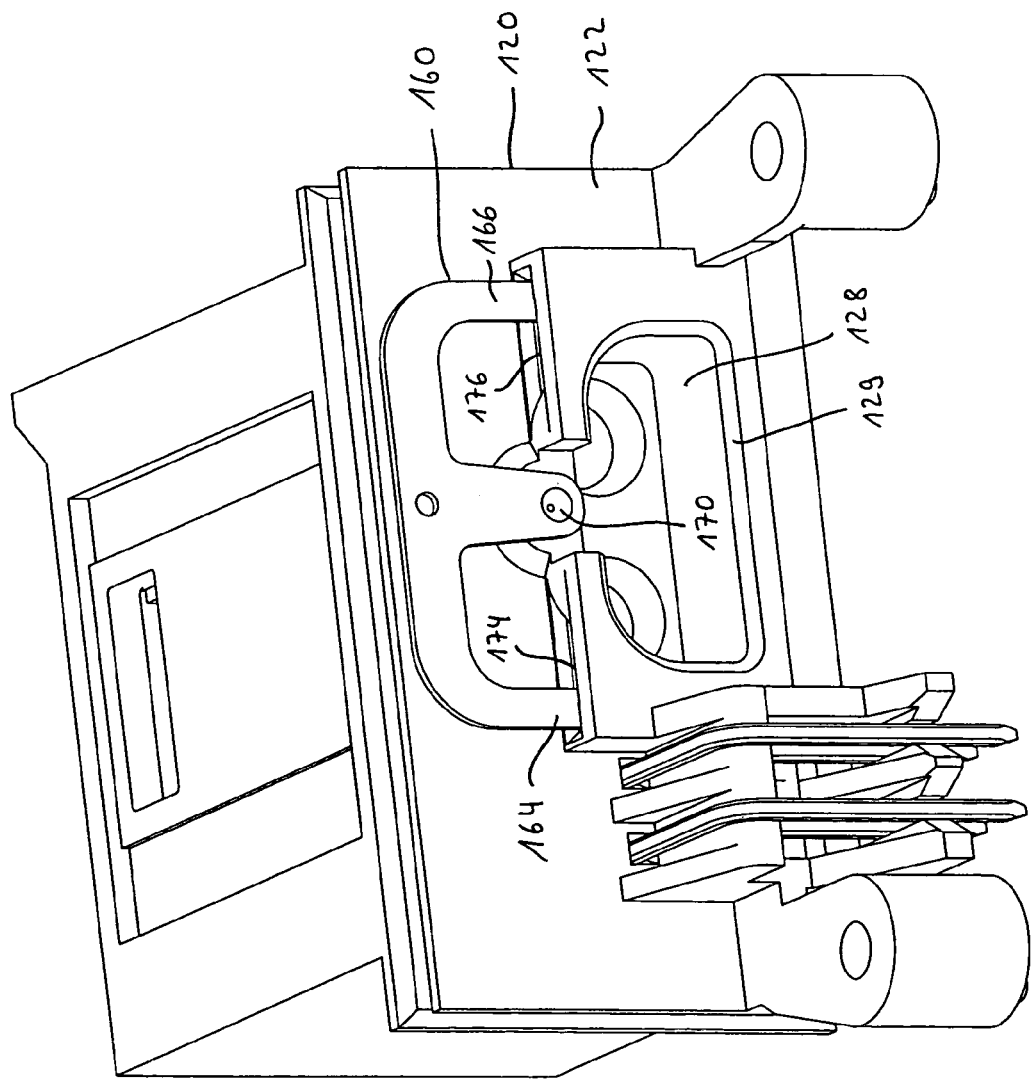
FIG. 5 shows a perspective view obliquely from behind of the connector from FIG. 4, with the spring in the insertion position.

Referring to FIG. 5, the leaf spring 160 is shown in the insertion position, the dome 170 engaging the recess 172 and thus locking the leaf spring 160 in the insertion position. The leaf spring 160 is also detachably mounted at the connector housing 122 by means of its holding legs 164, 166 inserted into the holding channels 174, 176.

Figure 6:
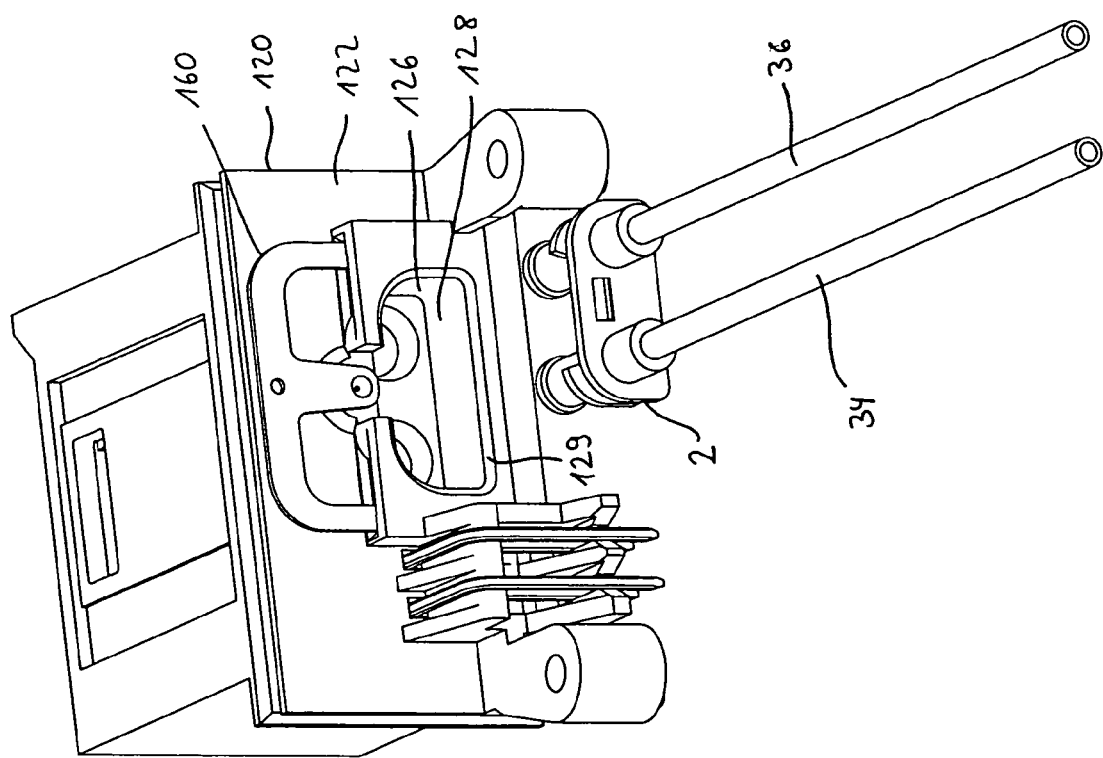
FIG. 6 shows a perspective view obliquely from behind of the connector arrangement with the connector from FIG. 4 and the fiber holder.

In the insertion position, the fiber holder 2 can now be inserted into the sleeve receptacle or ferrule receptacle 126 as shown in FIG. 6. During this process, a rear bevel 129 facilitates the introduction into the cavity 128.

Figure 7:
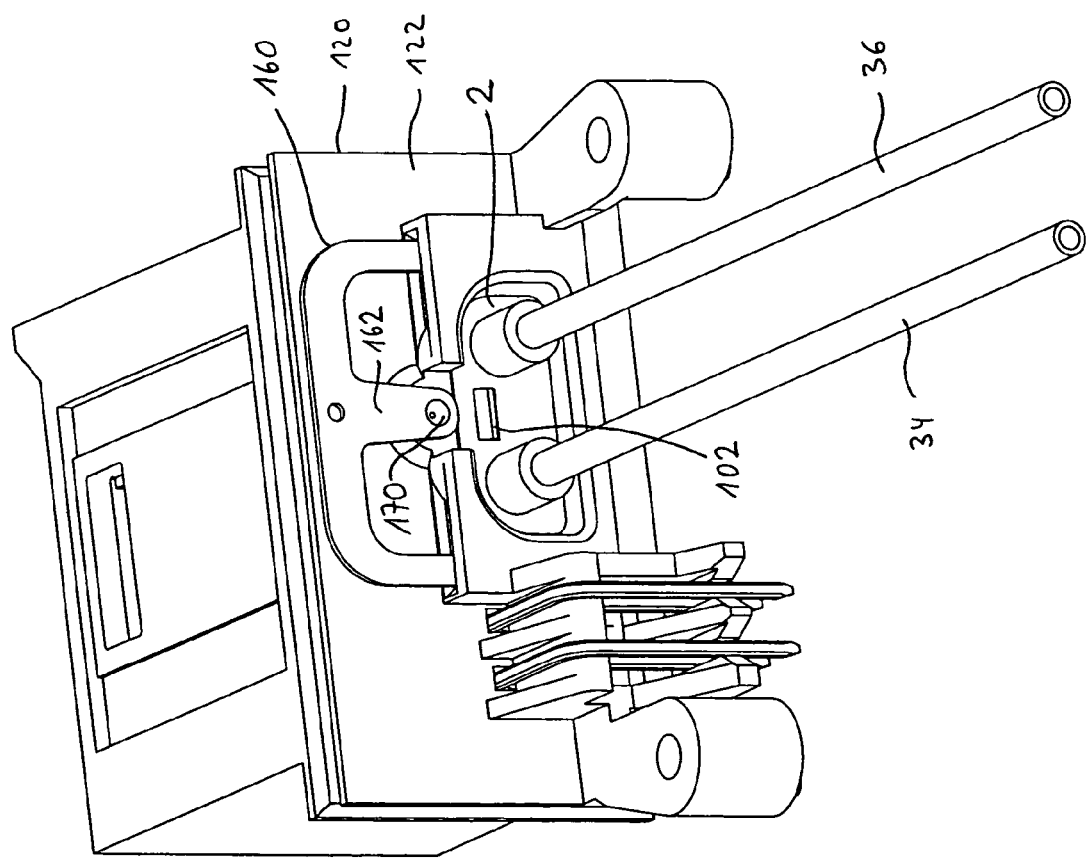
FIG. 7 shows a perspective view obliquely from behind of the connector arrangement from FIG. 6 with the fiber holder inserted.

FIG. 7 shows the fiber holder 2 in a completely inserted state.

For detachably mounting the fiber holder 2, the leaf spring 160 is then pushed from its insertion position into the closing position downwardly, the dome 170 sliding over the protrusion 102 in order to lock behind it.

Figure 8:
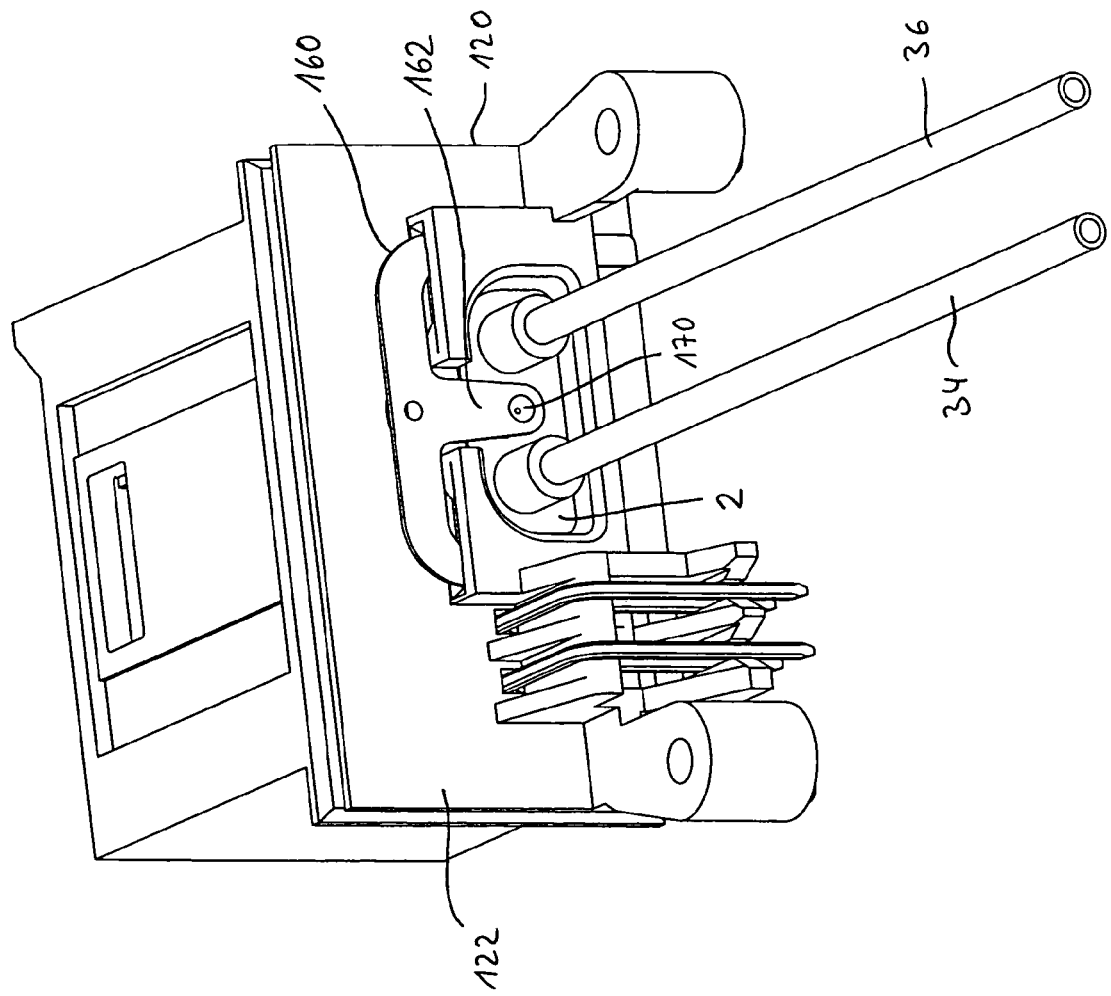
FIG. 8 shows a perspective view obliquely from behind of the connector arrangement from FIG. 6 with fiber holder inserted and the spring in a closing position.

The operating state shown in FIG. 8 is now achieved. In the operating state, the pretension of the spring arm 162 is also greater than in the insertion position.

Figure 9:
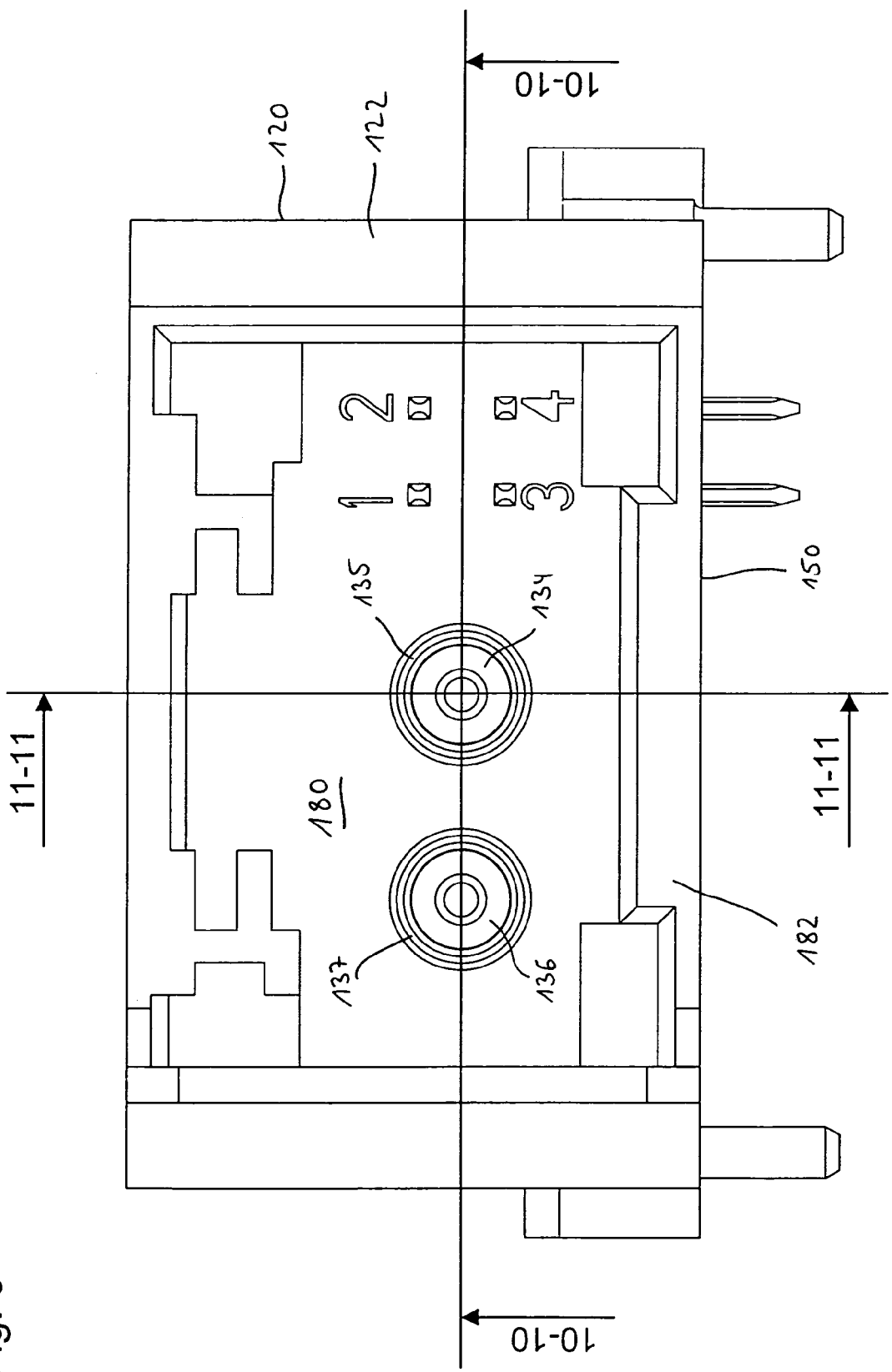
FIG. 9 shows a top view of the front of a connector arrangement from FIG. 8.

Referring to FIG. 9, the mating-connector receptacle 180, which is constructed as opening in the front 182 of the connector housing 122, is shown. A mating connector, not shown, can now be inserted into the opening 180 in order to establish an electro-optical connection.

FIG. 10 shows best that the guide sections or beads 24, 26 at the front ends of the sleeves 4, 6 provide precise guidance within the channels 134, 136 and the transverse strut 12 engages the stop surface 130.

The leaf spring 160 engages with its dome 170 the rear of the connecting element 8 and thus pretensions the fiber holder 2 against the connector housing 22, more precisely the transverse strut 12 against the stop surface 130.

To further improve the tilting capability and for easier insertion, the two channels 134, 136 are provided with rear bevels 184, 186 and intermediate sections 194, 196 which extend between the beads 24, 26 and the stop surfaces 14, 16 have a smaller diameter than the beads 24, 26 and than the channels 134, 136.

It is also shown that both the stop elements 14, 16 and the guide element 10 have transverse play 188 with respect to the receptacle or opening 126 in order to allow a tilting movement when the two waveguides of the mating connector (not shown) have a different length or the mating connector is inserted in a slightly tilted manner.

Figure 11:
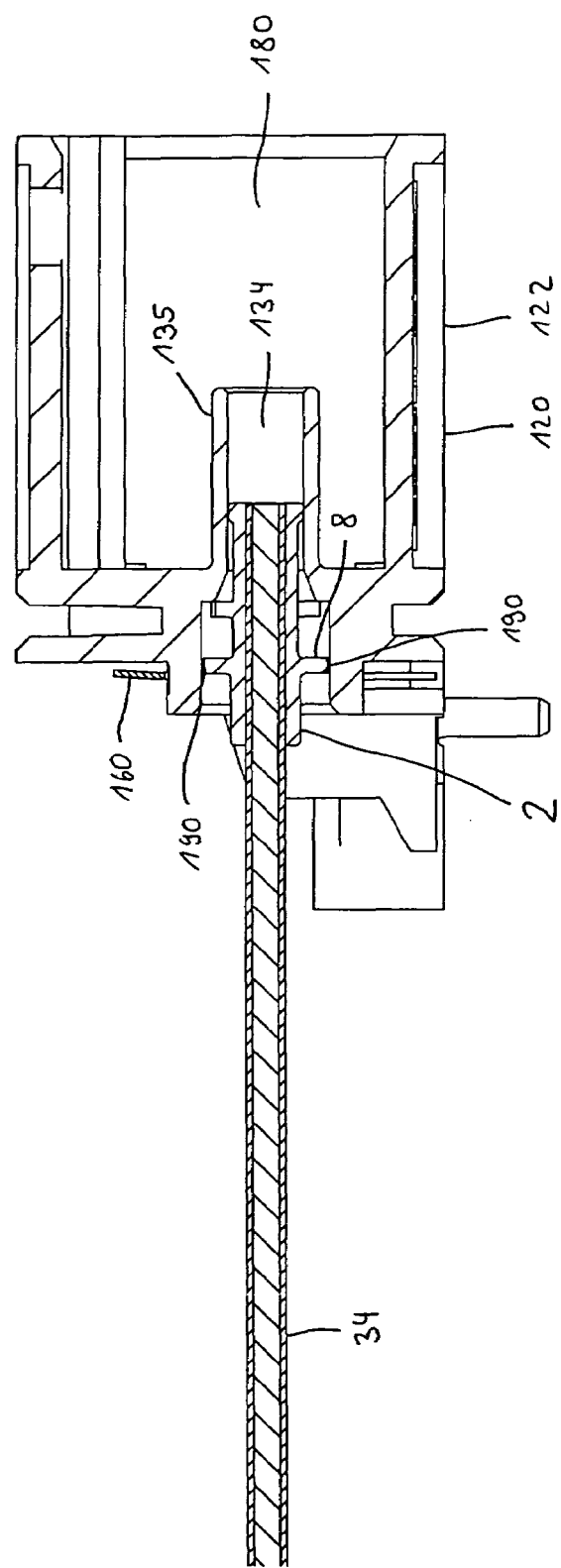
FIG. 11 shows a vertical cross section through the connector arrangement along line 11-11 in FIG. 9.

As can be seen in a comparison of FIG. 11 and FIG. 10, the vertical play 190 of the guide element 8 is smaller than the horizontal play 188.

The skilled person can see that the embodiments described above must be understood as examples and the invention is not restricted to these but can be varied in a manifold manner without departing from the spirit and scope of the invention.

The invention claimed is:

1. A connector arrangement for connecting optical fibers comprising:
    a connector with a connector housing which has a front mating-connector receptacle for mating connection with a mating connector and a rear fiber receptacle,
    a first fiber section which has a first end which is enclosed by a first sleeve, the first sleeve being connected permanently and fixedly to the first fiber section,
    at least one further second fiber section which has a first end which is enclosed by a second sleeve,
    the second sleeve being permanently and fixedly connected to the second fiber section,
    wherein the fiber receptacle is constructed for receiving the first ends of the first and second fiber sections,
    wherein the first and second sleeves form a common fiber holder for the first and second fiber section and wherein the common fiber holder is constructed as an integral unit and can be inserted into the fiber receptacle of the connector housing, and
    a single spring for applying a force to the fiber holder essentially in the direction of insertion of the fiber holder so that a pretension of the fiber sections jointly against the connector housing is created.

2. The connector arrangement as claimed in claim 1, wherein the connector housing comprises a first and second cylindrical guide and the fiber receptacle has at least one first and second channel which are defined by the first and second cylindrical guides, respectively, and wherein the first and second sleeves can be inserted into the first and second channels, respectively.

3. The connector arrangement of claim 1, wherein the fiber holder has a connecting section that is arranged between the first and second sleeves and by means of which the first and second sleeves are integrally connected to one another.

4. The connector arrangement of claim 1 wherein the spring can be attached directly to the connector housing.

5. The connector arrangement of claim 1 wherein the spring is constructed as a leaf spring.

6. The connector arrangement of claim 1 wherein the connector housing has holding channels into which the leaf spring can be inserted.

7. The connector arrangement of claim 6 wherein the leaf spring comprises two holding sections and an elastic spring arm arranged between these, wherein the holding sections can be inserted into the holding channels and the spring arm engages a connecting section of the fiber holder in an assembled state in order to create the pretension.

8. The connector arrangement of claim 1 wherein the fiber holder has a collar-like guide element which can be inserted into the fiber receptacle of the connector housing.

9. The connector arrangement of claim 8 wherein the collar-like guide element is constructed transversely asymmetrically.

10. A connector arrangement for connecting optical fibers comprising:
    a connector with a connector housing which has a front mating-connector receptacle for mating connection with a mating connector and a rear fiber receptacle,
    a first fiber section which has a first end which is enclosed by a first sleeve, the first sleeve being connected permanently and fixedly to the first fiber section,
    at least one further second fiber section which has a first end which is enclosed by a second sleeve,
    the second sleeve being permanently and fixedly connected to the second fiber section,
    wherein the fiber receptacle is constructed for receiving the first ends of the first and second fiber sections,
    wherein the first and second sleeves form a common fiber holder for the first and second fiber section and wherein the common fiber holder is constructed as an integral unit and can be inserted into the fiber receptacle of the connector housing and includes a collar-like guide element which can be inserted into the fiber receptacle of the connector housing, said collar-like guide element is transversely constructed smaller than the fiber receptacle at least in as much as there is lateral play which is adequately dimensioned for enabling a tilting movement of the fiber holder in the connector housing.

11. The connector arrangement of claim 10 wherein the collar-like guide element is smaller by 50 μm to 1 mm than the fiber receptacle at the corresponding position.

12. A connector arrangement for connecting optical fibers comprising:
    a connector with a connector housing which has a front mating-connector receptacle for mating connection with a mating connector and a rear fiber receptacle,
    a first fiber section which has a first end which is enclosed by a first sleeve, the first sleeve being connected permanently and fixedly to the first fiber section,
    at least one further second fiber section which has a first end which is enclosed by a second sleeve,
    the second sleeve being permanently and fixedly connected to the second fiber section,
    wherein the fiber receptacle is constructed for receiving the first ends of the first and second fiber sections,
    wherein the first and second sleeves form a common fiber holder for the first and second fiber section and wherein the common fiber holder is constructed as an integral unit and can be inserted into the fiber receptacle of the connector housing and includes a collar-like guide element which can be inserted into the fiber receptacle of the connector housing, said fiber holder having stop sections that are arranged in front of the collar-like guide element in the direction of insertion of the fiber holder into the connector housing.

13. The connector arrangement of claim 12 wherein the fiber holder in each case comprises a stop section at each sleeve, the stop sections being transversely separated.

14. The connector arrangement of claim 12 wherein the stop sections are asymmetrically constructed.

15. The connector arrangement of claim 12 wherein the stop sections are constructed transversely smaller than the collar-like guide element.

16. The connector arrangement of claim 1 wherein the first and second sleeve have a first and second guide section and a first and second intermediate section, the intermediate sections being arranged behind the respective guide section in the direction of insertion of the fiber holder and the intermediate sections having a smaller diameter than the guide sections.

17. The connector arrangement of claim 1 wherein the connector is a hybrid connector that comprises electrical connections for establishing electrical connections.

18. The connector of claim 1 wherein the mating-connector receptacle is constructed as an opening in the front of the connector housing, into which opening the mating connector can be introduced, wherein the fiber receptacle is formed by a common hollow space and two channels, and is thus arranged for introducing the fiber holder which is constructed jointly and integrally for both fiber sections, and wherein the two channels are formed by essentially cylindrical guides which protrude into the opening of the mating-connector receptacle.

\* \* \* \* \*